United States Patent [19]

Wehinger

[11] Patent Number: 5,793,285
[45] Date of Patent: Aug. 11, 1998

[54] METHOD AND DEVICE FOR TIRE MONITORING ON A VEHICLE

[75] Inventor: Horst Wehinger, Ebersbach, Germany

[73] Assignee: Mercedes-Benz AG, Stuttgart, Germany

[21] Appl. No.: 832,829

[22] Filed: Apr. 4, 1997

[30] Foreign Application Priority Data

Apr. 6, 1996 [DE] Germany .................. 196 13 916.3

[51] Int. Cl.$^6$ .................................................. B60C 23/00
[52] U.S. Cl. .................... 340/443; 340/442; 340/444; 73/146; 116/34 R; 200/61.22
[58] Field of Search .......................... 340/443, 444, 340/442; 200/61.22, 61.23, 61.24; 116/34 R; 73/146, 146.2

[56] References Cited

U.S. PATENT DOCUMENTS

| | | | |
|---|---|---|---|
| 4,149,140 | 4/1979 | Evans et al. | 340/443 |
| 4,180,794 | 12/1979 | Claxton | 340/443 |
| 4,246,567 | 1/1981 | Miller | 340/443 |
| 5,483,220 | 1/1996 | Kushimoto et al. | 340/444 |
| 5,561,244 | 10/1996 | Olesky et al. | 73/146 |
| 5,569,848 | 10/1996 | Sharp | 73/146.2 |

FOREIGN PATENT DOCUMENTS

| | | |
|---|---|---|
| 0657 314 A1 | 12/1994 | European Pat. Off. . |
| 3029563 C2 | 2/1982 | Germany . |
| 3236520 A1 | 4/1984 | Germany . |
| 3909466 A1 | 10/1990 | Germany . |
| 56-112307 | 9/1981 | Japan ............. 340/443 |

*Primary Examiner*—Jeffery Hofsass
*Assistant Examiner*—Sihong Huang
*Attorney, Agent, or Firm*—Evenson, McKeown, Edwards & Lenahan, P.L.L.C.

[57] ABSTRACT

The invention provides a method and apparatus for monitoring tires on a vehicle to detect adverse tire operating states, by continuously measuring the distance between the associated vehicle axle (or a vehicle body part rigidly connected thereto) and the road while the vehicle is in operation. From this measurement, the tire deflection is determined, which represents a comparatively exact measure of the respective tire load. When the tire deflection determined leaves a predetermined desired range, a warning signal is transmitted.

7 Claims, 1 Drawing Sheet

METHOD AND DEVICE FOR TIRE MONITORING ON A VEHICLE

This application claims the priority of German priority document 196 13 916.3, the disclosure of which is expressly incorporated by reference herein.

BACKGROUND AND SUMMARY OF THE INVENTION

The invention relates to a method and apparatus for vehicle tire monitoring, whereby adverse tire load states can be detected while the vehicle is in continuous operation.

Such a method and apparatus are known from German patent document DE-OS 39 09 466 A1, in which tire deflection is determined by comparing the measured distance between the road and a predetermined point on the wheel suspension with a normal distance. A warning signal is transmitted as soon as the tire deflection determined exceeds an upper limit value or falls below a lower limit value.

U.S. Pat. No. 5,483,220 describes a device for detecting a loss of air in vehicle tires, in which the tire pressure is recorded directly for one wheel only, and is used as a reference for the measured angular speed of each wheel to detect the air loss. The determination of air loss is interrupted in periods of time in which the longitudinal or transverse acceleration of the vehicle exceeds predetermined limit values.

Published European patent application EP 0 657 310 A1 describes an alarm device for warning of tire pressure losses, in which alarm stages are established as a function of the percentage air loss detected and the instantaneous vehicle speed.

Methods and devices for vehicle tire monitoring are also known in which the tire pressure is determined continuously while the vehicle is in operation and a warning signal is transmitted as soon as the tire pressure leaves a predetermined desired range (especially, becomes too low). The tire pressure can be recorded directly by means of a pressure sensor assembly, but this technique is comparatively complicated when the vehicle is in operation, on account of the rotating wheel. Frequently, therefore, in known systems the tire pressure is determined indirectly by recording the wheel rotational speed and deriving from this an associated driving speed value which is then compared with that of other wheels or with driving speed information obtained in another way. The tire pressure determined serves, above all, for estimating the tire load which, as is known, is determined primarily by the work performed by the tire, and therefore by its deformation during operation.

For example, German patent document DE-OS 32 36 520 A1 describes a device for indicating the state of vehicle tires, in particular the tire pressure and profile depth, in which a driving speed reference value obtained via the wheel rotational speeds is compared with the actual vehicle speed over ground, which is recorded by a corresponding sensor. A sudden pressure drop in a tire results, at a given vehicle speed, in a correspondingly rapid change in the wheel rotational speed and consequently in the vehicle speed reference value. The deviation of the latter from the actual vehicle speed can be recognized by the device. So that long-term tire state changes due to tire abrasion can also be monitored, a memory is provided in a central electronic control unit, in which the continuously measured wheel rotational speeds can be stored. By comparing the continuously determined wheel rotational speeds with the rotational speeds measured at the outset (after new tires have been fitted), the tire abrasion and consequently the tire profile depth are to be monitored over relatively long periods of time.

German patent document DE 30 29 563 C3 discloses a further method for indirectly determining tire pressure in vehicle wheels, in which low tire pressure is recognized by a special sensor assembly and evaluation circuit that takes into account the ambient temperature, the load state of the vehicle and the atmospheric air pressure.

The journal article "Reifendruck im Blickfeld" ["Tire Pressure in the Field of Vision"], Automobil-Elektronik, September 1990, page 30, discloses monitoring systems for vehicle tires, in which a central control unit combines the data from a tire pressure sensor assembly with further sensor signals giving information on the outside temperature, brake temperature, vehicle speed and vehicle load state. Based on this information, it recognizes when the pressure in the tire is too far below a predetermined desired pressure, and provides the driver with a warning signal via a visual display.

One object of the present invention is to provide a method and apparatus of the type mentioned above, which monitors the tire load state reliably and at relatively little outlay, when the vehicle is in continuous operation.

This object is achieved according to the invention, in which the tire deflection (that is, the difference between the free tire radius and the height of the tire centerpoint above ground) is determined by means of a distance measurement. For this purpose, the height of an associated vehicle axle, or a vehicle body part rigidly connected thereto, above the road is measured continuously while the vehicle is in operation.

The tire deflection thus determined is a more direct and therefore more reliable measure of the existing tire load than the tire pressure. For example, with the tire pressure being constant, different deformations of the tire in the region of its contact area occur with changing driving speed and result in corresponding changes in the tire deflection. The recording of a tire deflection therefore allows a highly reliable assessment of tire operating strength and safety. Moreover, the distance measurement on a stationary vehicle body part is comparatively simple and leaves complete freedom with regard to the structural shape of the wheel. Direct tire pressure measurement, on the other hand, must be made on a rotating structural part and the structural shape of the wheel must be suitably adapted frequently for this purpose.

According to the invention, the tire operating strength and safety are assessed in a special way, by predetermining a desired range for the tire deflection as a function of at least the vehicle speed and the vehicle load. The time profile of the determined tire deflection values is stored separately for each tire, at least during those operating phases in which the tire deflection is outside the predetermined desired range for the relevant tire. This is based on the knowledge that the total tire stress, and therefore the respective instantaneous state of the tire, are determined essentially by the proportion of the overall operating time during which the tire has been operated with a deflection that is outside the suitably predetermined desired range.

In a preferred embodiment of the invention, an averaging process is used to determine the tire deflection. This process averages a plurality of successively obtained distance measurement values themselves, or the individual tire deflection values derived therefrom. As a result, brief dynamic disturbing influences (caused, for example, by wheel load fluctuations during travel over an uneven stretch of road or by road unevenness at particular points in the recording range of the distance-measuring sensor assembly) are eliminated, or at least sufficiently attenuated.

In another embodiment, measurements made during periods when appreciable acceleration forces act on the vehicle are ignored in the determination of tire deflection. This is done because acceleration-related fluctuations in the tire deflection may occur in these operating phases, and therefore do not point to an adverse tire state.

According to another feature of the invention, each monitored vehicle tire is assigned its own distance-measuring sensor assembly arranged on an axle portion adjacent to the vehicle tire, so that each distance-measuring sensor assembly records primarily the deflection of the associated tire. The various tire deflection values are obtained from the recorded measurement values of the several distance-measuring sensors in the valuation unit. Depending on the desired accuracy and the vehicle design, the influence of the deflection of a tire on the remaining distance-measuring sensors not assigned to this tire can also be taken into account.

Other objects, advantages and novel features of the present invention will become apparent from the following detailed description of the invention when considered in conjunction with the accompanying drawings.

DETAILED DESCRIPTION OF THE DRAWINGS

Figure 1:
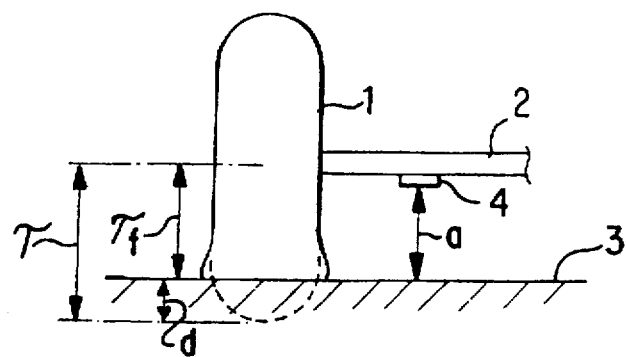
FIG. 1 is a diagrammatic representation of the region of a monitored vehicle tire of a motor vehicle with an associated distance-measuring sensor assembly.

FIG. 1 shows diagrammatically one of, for example, four wheels of a motor vehicle. The wheel is mounted on a vehicle axle (2) and contains a tire (1) which rolls on a road (3) while the vehicle is in operation. As is known, the tire (1) is deformed in the region of its contact area on account of the forces acting on it, so that the distance ($r_f$) between the tire centerpoint and the road (3) is smaller than the free tire radius (r) before the fitting of the tire (1). The difference $d = r - r_f$ between the free tire radius (r) and the distance ($r_f$) of the tire centerpoint above ground is designated as the tire deflection, and is thus a measure of the tire deformation and consequently of the load on the tire.

Figure 2:
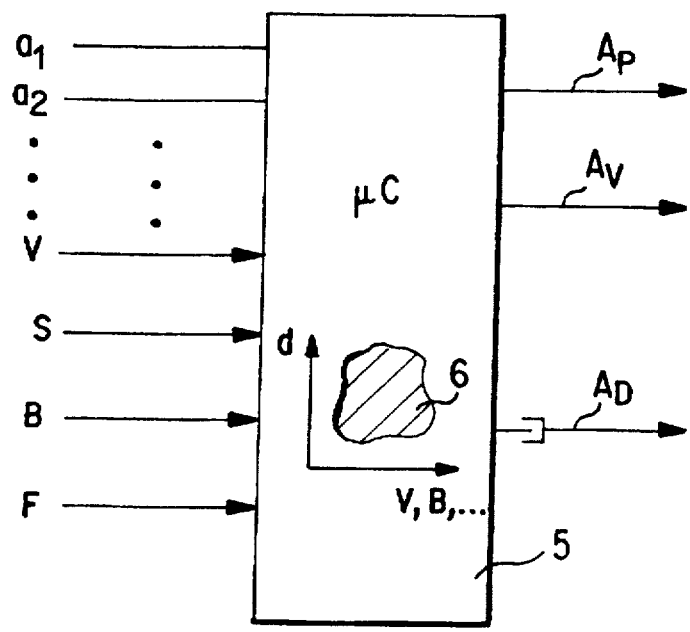
FIG. 2 is a block diagram which depicts a central microprocessor for evaluating the measurement values obtained from the distance-measuring sensors of FIG. 1.

To determine the tire deflection (d), the monitored vehicle tire (1) is assigned a distance-measuring sensor assembly (4), which is arranged on the underside of the adjacent portion of the associated vehicle axle (2) and measures its distance (a) from the road (3). This measured distance (a) (less the vertical distance between the tire centerpoint and the distance-measuring sensor assembly (4), which is constant) corresponds to the distance ($r_f$) between the tire centerpoint and the road (3) and can therefore be used as a measure of this distance ($r_f$), and therefore of the tire deflection (d). A microprocessor (5), such as is illustrated in FIG. 2, determines the tire deflection (d) from the measured distance values (a).

The microprocessor (5) receives as inputs the distance measurement values ($a_1$, $a_2$, ...) obtained from the various distance-measuring sensors (4), from which it determines the tire deflection ($d_1$, $d_2$, ...) associated with the respective tire (1). The microprocessor (5) receives as further input information the vehicle speed (v), the mileage (s) covered hitherto with the tire set fitted, the vehicle load (B) and signals (F) from a longitudinal and a transverse acceleration sensor assembly. (These signals are represented in simplified form by a single input channel.)

Sensor units for recording these input variables (v, s, B, F) are well known, and therefore are not discussed in any more detail here. Alternatively, the mileage (s) can be calculated by the microprocessor (5) by integrating the supplied vehicle speed information (v) over the vehicle operating time. The transverse acceleration sensor used may be, for example, a steering-angle sensor or a tilt sensor. Longitudinal acceleration sensors are used, for example, to recognize high vehicle decelerations and trigger an airbag system or a belt tightener system. An operating phase in which the vehicle is actively decelerated may be recognized in the simplest way from the switching state of a stop light switch which, in this case, serves as a simple longitudinal acceleration sensor element.

Filed in a memory part of the microprocessor (5) is a characteristic map (6) which defines a desired range for the tire deflection (d) as a function of the other input parameters, in particular the vehicle speed (v) and the vehicle load (B). (The map is shown in simplified form in the insert of FIG. 2, in two-dimensional projection only.) This desired range (6) is predetermined so as to embrace the favorable tire operating states, and delimits them from adverse ones which result in excessive tire load and which consequently diminish tire operating safety and tire life.

The input signal information (F) on the instantaneous longitudinal and transverse acceleration of the vehicle is used by the microprocessor (5), when determining the tire deflection, to ignore the distance sensors (4) during operating phases in which the longitudinal and/or transverse accelerations exceed a respective predetermined positive limit value or fall below a negative limit value. Alternatively, it cuts off the distance sensors (4) in these operating phases. This is done because, in such operating phases, there are unequal wheel-load distributions over the various vehicle wheels on account of the positive or negative acceleration (deceleration) in the longitudinal direction or transverse direction of the vehicle. As a result, the distance measurement values ($a_1$, $a_2$, ...) obtained from the individual distance-measuring sensor assemblies (4) deviate in these acceleration operating phases from their normal value during acceleration-free operating phases.

As an alternative to blanking out acceleration operating phases in this way for the determination of tire deflections ($d_1$, $d_2$, ...), the microprocessor (5) may be designed so that it suitably corrects the various distance measurement values ($a_1$, $a_2$, ...) obtained during such acceleration operating phases.

As a further measure against errors in determining the tire deflection (d) due to temporary dynamic disturbing influences, the microprocessor (5) performs (separately for each vehicle tire (1)) a sliding averaging of the associated, successively recorded distance measurement values ($a_1$, $a_2$, ...), which average is used to determine the associated tire deflection ($d_1$, $d_2$, ...). This eliminates brief disturbing influences, such as may occur, for example, as dynamic wheel load fluctuations during travel over an uneven road or as a result of road unevenness at particular points in the recording range of the respective distance-measuring sensor assembly (4).

The microprocessor (5) then compares the tire deflection value ($d_1$, $d_2$, ...) for each vehicle tire (1) (obtained in this way via an averaging process) with the filed desired range (6), taking into account the other respective input parameters, such as vehicle speed (v) and vehicle load (B). Whenever the determined tire deflection ($d_1, d_2, \ldots$) exceeds the predetermined desired range (6) for a particular tire (1), the microprocessor (5) transmits via a first output channel ($A_p$) a corresponding warning signal, indicating that a tire deflection is outside the favorable range (for example is too high) for the relevant tire, and there is therefore excessive tire load. This warning signal can serve at the same time as a signal to change the air pressure in the relevant tire (1) correspondingly. Moreover, a warning of too high a vehicle speed can be transmitted via a second output channel ($A_v$). Such a warning signal is transmitted by the microprocessor (5) when it recognizes from the input variables supplied that, on account of too high a vehicle speed, one or more vehicle tires (1) are in an adverse operating state with excessively high tire stress, so that the vehicle speed should be reduced.

Furthermore, via a third output channel ($A_D$) of the microprocessor (5), it is possible to read out the total stress which each vehicle tire (1) has undergone during its use up to that time. This information can serve as a highly reliable basis for assessing further tire operating safety and tire load-bearing capacity. For this purpose, the microprocessor (5) retrievably stores the time profile of the determined tire deflection values ($d_1, d_2, \ldots$) separately for each tire, specifically at least during those operating phases, in which, for the relevant tire (1), the tire deflection ($d_1, d_2, \ldots$) is outside the predetermined desired range (6) and in which there is therefore excessively high tire load.

The vehicle tire monitoring arrangement according to the invention provides a highly reliable means for monitoring tire operating states with excessive tire load. For this purpose the tire deflection (d), which is a primary measure of tire deformation (and consequently tire load during operation) is determined directly by measuring the distance between a stationary vehicle body part and the road. The tire deflection information obtained thereby constitutes a more reliable criterion for assessing the tire load than merely information on the tire pressure.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Method for monitoring a tire on a vehicle, comprising the steps of:

while the vehicle is in operation, measuring continuously a distance between one of an associated vehicle axle and a vehicle body part rigidly connected thereto, and the road;

determining separately for each tire a value for tire deflection based on measured distance values;

providing predetermined desired range for tire deflection as a function of at least vehicle speed and vehicle load;

transmitting a warning signal when determined tire deflection leaves the desired range; and to assess the total tire stress, retrievably storing a time profile of tire deflection values determined separately for each tire, at least during operating phases when said tire deflection is outside the predetermined desired range.

2. Method according to claim 1 wherein the tire deflection is determined by an averaging process, over a plurality of successively obtained distance measurements.

3. Method according to claim 1 wherein distance measurements made when longitudinal or transverse acceleration of the vehicle exceeds a predetermined positive limit value or falls below a predetermined negative limit value are disregarded.

4. Device for monitoring a tire on a vehicle, comprising:

a distance-measuring sensor assembly for measuring a distance between one of an associated vehicle axle and a vehicle body part rigidly connected thereto, and the road; and an evaluation unit for determining tire deflection based on distance measurement values obtained from the distance-measuring sensor assembly, said evaluation unit comprising a microprocessor, in which a predetermined desired range for tire deflection is stored as a function of at least vehicle speed and vehicle load, and which transmits a warning signal when determined tire deflection exceeds the desired range;

wherein to assess total tire stress, a time profile of determined tire deflection values is retrievably stored separately for each tire, at least when determined tire deflection exceeds the desired range for the relevant tire.

5. Device according to claim 4 further comprising:

a longitudinal or transverse acceleration sensor assembly having an output which is supplied to the microprocessor for determination of tire deflection;

wherein the microprocessor is programmed to ignore measurement values from the distance-measuring sensor assembly which are supplied when sensed acceleration exceeds a predetermined positive limit value or falls below a predetermined negative limit value.

6. Device according to claim 4 wherein each monitored vehicle tire has a separate distance-measuring sensor assembly arranged on an axle portion adjacent to the vehicle tire.

7. Device according to claim 5 wherein each monitored vehicle tire has a separate distance-measuring sensor assembly arranged on an axle portion adjacent to the vehicle tire.

* * * * *